United States Patent [19]

Rosser et al.

[11] Patent Number: 5,264,933
[45] Date of Patent: Nov. 23, 1993

[54] TELEVISION DISPLAYS HAVING SELECTED INSERTED INDICIA

[75] Inventors: Roy J. Rosser, Princeton, N.J.; Martin Leach, London, England

[73] Assignee: Princeton Electronic Billboard, Inc., Princeton, N.J.

[21] Appl. No.: 826,754

[22] Filed: Jan. 28, 1992

[51] Int. Cl.⁵ .................. H04N 5/262; H04N 5/272
[52] U.S. Cl. .......................... 358/183; 358/22; 358/93; 358/83; 345/139
[58] Field of Search .............. 358/183, 182, 181, 160, 358/166, 22, 105, 21 R, 93, 185, 83, 84; 340/720, 723, 721, 725, 728, 734, 747, 703, 729; 382/48, 44-47, 10

[56] References Cited

U.S. PATENT DOCUMENTS

| | | | |
|---|---|---|---|
| 2,921,124 | 1/1960 | Graham | 178/6 |
| 3,016,518 | 1/1962 | Taylor | 340/149 |
| 3,051,778 | 8/1962 | Graham | 178/6.8 |
| 3,140,710 | 7/1964 | Glassner | 128/2.05 |
| 3,315,222 | 4/1967 | Bogs | 340/15.5 |
| 3,470,468 | 9/1969 | Halpern | 324/77 |
| 3,473,121 | 10/1969 | Hurtig | 324/77 |
| 3,582,957 | 6/1971 | Herleikson | 346/33 |
| 3,715,477 | 2/1973 | Olson | 178/5.4 |
| 3,731,188 | 5/1973 | Smith | 324/77 |
| 3,737,855 | 6/1973 | Cutaia | 340/146.3 |
| 3,742,201 | 6/1973 | Groginsky | 235/156 |
| 3,887,762 | 6/1975 | Uno | 178/6 |
| 3,973,239 | 8/1976 | Kakumoto | 340/146.3 |
| 3,983,328 | 9/1976 | Newell | 178/6.8 |
| 3,996,421 | 12/1976 | Pruznick | 178/7.3 |
| 4,000,399 | 12/1976 | Kawahara | 235/92 |
| 4,010,446 | 3/1977 | Kawa | 340/146.3 |
| 4,055,756 | 10/1977 | Jolivet | 364/725 |
| 4,057,828 | 11/1977 | Monahan | 358/32 |
| 4,134,134 | 1/1979 | Lux | 358/280 |
| 4,163,258 | 7/1979 | Ebihara | 358/167 |
| 4,205,341 | 5/1980 | Mitsuya | 358/135 |
| 4,222,076 | 9/1980 | Knowlton | 358/263 |
| 4,242,705 | 12/1980 | Ebihara | 358/167 |

(List continued on next page.)

FOREIGN PATENT DOCUMENTS

9102995.9 2/1990 United Kingdom .
9019770.8 9/1990 United Kingdom .

OTHER PUBLICATIONS

Burt, Peter J.; Pyramid-Based Extraction of Local Image Features with Applications to Motion and Texture Analysis.
Burt, Peter J.; Fast Algorithms for Estimating Local Image Properties.

*Primary Examiner*—Mark R. Powell
*Assistant Examiner*—Michael H. Lee
*Attorney, Agent, or Firm*—Arthur L. Plevy

[57] ABSTRACT

An apparatus and method of altering video images to enable the addition of images, message, slogans or indicia in such a manner that they appear to be part of the original image as displayed. The application of the apparatus and method is particularly adapted to be used as advertising during sporting events or other events whereby an operator selects a portion of the video image display (16) such as a portion of a tennis court (12), recognizes the selected portion (17) and inserts a logo or advertising message (27) into that selected portion. The message is inserted into the selected portion of the court independent of how the scene is being panned or viewed by the television camera. The apparatus employs a pattern recognition algorithm such as the Burt Pyramid Algorithm to recognize the specific selected image portion and by means of the image processor (17, 20, 27) substitute the logo into the first image (16) to provide a display which appears as if the inserted image was actually painted on or otherwise permanently positioned on the court. Thus the inserted images are seamlessly and realistically incorporated into the original even as the original scene is moved, panned, magnified, zoomed or otherwise altered in size or perspective. The resulting composite image appears to the television viewer to be absolutely real and present at the scene.

45 Claims, 3 Drawing Sheets

U.S. PATENT DOCUMENTS

| | | | |
|---|---|---|---|
| 4,245,248 | 1/1981 | Netravali | 358/136 |
| 4,261,018 | 4/1981 | Knowlton | 358/263 |
| 4,261,043 | 4/1981 | Robinson | 364/725 |
| 4,286,330 | 8/1981 | Isaacson | 364/900 |
| 4,405,943 | 9/1983 | Kanaly | 358/133 |
| 4,442,454 | 4/1984 | Powell | 358/167 |
| 4,447,886 | 5/1984 | Meeker | 364/725 |
| 4,463,381 | 7/1984 | Powell | 358/166 |
| 4,513,317 | 4/1985 | Ruoff, Jr. | 358/133 |
| 4,523,230 | 6/1985 | Carlson | 358/167 |
| 4,566,126 | 1/1986 | Myagawafl | 358/22 |
| 4,569,079 | 2/1986 | Yoshida | 358/183 |
| 4,591,897 | 5/1986 | Edelson | 358/22 |
| 4,661,986 | 4/1987 | Adelson | 382/41 |
| 4,667,221 | 5/1987 | Cawley et al. | 358/22 |
| 4,667,236 | 5/1987 | Dresdner | 358/22 |
| 4,674,125 | 6/1987 | Carlson | 382/49 |
| 4,692,806 | 9/1987 | Anderson | 358/209 |
| 4,698,843 | 10/1987 | Burt | 382/54 |
| 4,700,232 | 10/1987 | Abt et al. | 358/22 |
| 4,724,543 | 2/1988 | Klevecz | 382/6 |
| 4,750,211 | 6/1988 | Wray | 382/41 |
| 4,817,175 | 3/1989 | Tenenbaum | 382/41 |
| 4,908,700 | 3/1990 | Ishii et al. | 358/183 |
| 4,947,256 | 8/1990 | Wood et al. | 358/183 |
| 4,949,165 | 8/1990 | Riemann et al. | 358/22 |
| 4,979,021 | 12/1990 | Thomas | 358/22 |
| 5,046,165 | 9/1991 | Pearlman et al. | 358/183 |
| 5,058,189 | 10/1991 | Kanno | 382/61 |
| 5,060,068 | 10/1991 | Lindstrom | 358/86 | dr
TELEVISION DISPLAYS HAVING SELECTED INSERTED INDICIA

RELATED APPLICATIONS AND PRIORITY DOCUMENTS

This invention is related to British Patent Application Ser. No. 9102995.9, entitled Electronic Billboard: A Method of Advertising Using Existing Television Transmission Facilities, filed Feb. 13, 1991 by Roy J. Rosser & Martin Leach, which application is based upon a provisional application filed Feb. 14, 1990. In addition, this application is related to British Patent Application Ser. No. 9019770.8, entitled Audio Enhanced Electronic Billboard, filed Sep. 10, 1990 by Roy J. Rosser.

TECHNICAL FIELD

The present invention relates to a method of advertising using conventional television transmission facilities. In particular, the invention relates to methods for merging or inserting a chosen image into a preselected existing image portion of a television service.

BACKGROUND ART

The conventional methods for merging video images include the "blue screen" or "chromo-key" techniques. For example, these techniques are used in the broadcast industry to show weather forecasters positioned in front of weather maps. In this technology, the forecaster is filmed in front of a screen having a particular pre-determined color. The screen color is usually blue, hence, the name of this technique. The technique calls for substituting the second image (the weather map) at all points in the first image (the forecaster) where the signal contains the blue color. The result is that the image of the map and forecaster will appear to merge. However, this method has two short comings. First, the forecaster must not have any item on his person that is the same color as the blue color of the screen. If he does, and the second image is merged with the first image, any item on the forecaster having the predetermined blue color will appear as a hole. Second, this technique does not provide for the integration of the two images. That is, the two images are merely superimposed. That is why the forecaster must make sweeping and general motions to indicate positions on the map. This limitation is important when considering this technique for an advertising application.

There are of course other techniques which enable the insertion of video images into an existing image which are basically employed at the studio and which utilize complicated console devices to superimpose a video picture on another video picture. Essentially the present technique involves a completely different approach with great applicability to television advertising. As will be explained, the present application relates to a method of advertising using existing television transmission facilities in which the advertiser selects predetermined areas in a video scene. These areas are then recognized using existing technology as pattern recognition techniques and the content of these areas is replaced by inserting an image or images of the advertisers choosing. In order to accomplish the present invention one must recognize the selected predetermined area and replace the same with advertising indicia in real time. The inserted indicia is then blended into the original video image in such a way that it appears part of the television scene and cannot be otherwise discerned by a typical viewer. The inserted advertising or messages can further be highlighted to the viewer by moving the message, changing color, associating the message with sound and otherwise imparting modulation to the message to distinguish the message during the course of the television program. Such techniques will be further described. Basically, it is believed that the techniques to be described herein have extreme usefulness and applicability for the display of advertising in television sporting events such as tennis matches, boxing, baseball, football and so on. While there is particular applicability to such events the techniques described may be adapted to all formats of video presentation and have general applicability to the field of advertising.

As will be described and in order to accomplish this result, one must basically select an object or an area within a given video image. For example the area selected may be a televised tennis court. This area is then recognized in each of a subsequent stream of video images and once recognized the video content of that image is replaced with a desired content which may be an advertising commercial, logo or some other matter. The insertion and replacement of the existing video image with the new material is accomplished completely independent of the size of the image in subsequent television scenes or frames. The system described herein will always recognize the particular area selected no matter what the size of the area is with respect to the remaining television picture. This, therefore, creates the illusion to the viewer that the replaced subject matter is actually that subject matter which is being televised in real time. Thus, the methods and apparatus described enable advertisers to add or merge images, messages or slogans to preexisting video images in such a way that they appear to be part of the original image even when the original video stream is of a live event being distributed in real time.

Thus, the techniques described herein are superior to prior art techniques of inserting video information. In order to do and accomplish the results of this particular application an electronic device is required to select, recognize and substitute images to be broadcast on live televised events. The device detects part or all of an object or objects within a video image and uses the position of the object or part thereof as a reference. The device then positions another still or video image into the original image at the reference location. The still or video image is positioned accurately so that the final composite image appears as though it is part of the original scene. That is, the added image is seamlessly and realistically incorporated into the original event. The appearance of the added image will conform to the appearance of the original scene when the scene is moved, panned, magnified, zoomed or otherwise altered in size or perspective. The System can also compensate for distortions by mapping the distortions in a televised scene and using the mapped distortions in future processing. All this must be done in real time, or with a processing delay being sufficiently small that it can be applied to events being transmitted live. The "Burt Pyramid" is the most appropriate way to do this amount of computation on a video image in such a short time with existing technology. This is a well known method of processing, analyzing and/or synthesizing signals and Real-Time Hierarchy Pyramid Signal Processing Apparatus by C. R. Carlson, et al. and issued on Jun. 16, 1987. The Burt Pyramid is also discussed in the publications entitled "Fast Algorithms for Estimating Local Image Properties", by Peter J. Burt, Computer Vision, Graphics and Image Processing 21, pp. 368-382, 1983 and "Pyramid-Based Extraction of Local Image Features with Application to Motion and Texture Analysis", by Peter J. Burt, SPIE, Vol. 360, pp. 114-124.

The "chromo-key" or "blue-screen" technology may be used in certain applications as an adjunct to the pattern recognition method. This technology is one way of distinguishing non-replaceable, foreground pixels from replaceable, background pixels. For instance, in a sport such as tennis, it is usually necessary to ensure that only the tennis court is replaced with a message merged onto the field of play. The players or their equipment should not be affected. One way to accomplish this is to replace only the green colored pixels that are in the merged image and are within the color range of the court. Alternate methods of distinguishing between replaceable and non-replaceable pixels include storing an image of the unoccupied court and subsequently using that image as a comparison to determine which is the player/equipment and which is the background. Another method uses differential motion between the objects or markings on the court and the equipment/players moving over the court to distinguish between replaceable and non-replaceable pixels.

Although the pattern recognition software using the "Burt Pyramid" algorithms is fast, it still takes a finite time to operate. Therefore, it may be necessary to introduce a time delay into the system. The delay may be one or two frames, or it may be longer. A frame store or other similar means can be used to temporarily locate a small number of the video screens or frames. Incorporating a time delay unit into the present invention will be discussed hereinafter.

Other conventional methods of processing video signals and images or the like are presented below. Some of the disclosed methods also use the Burt Pyramid.

An example of an apparatus that analyzes signals and the frequency spectrum for the frequency components of the signals is disclosed in U.S. Pat. No. 3,731,188, Signal Analysis of Multiplicatively Related Frequency Components in a Complex Signal, which issued May 1, 1973 to S. E. Smith. Other patents disclosing subject matter related thereto are U.S. Pat. Nos. 3,140,710, 3,315,222, 3,470,468, 3,473,121 and 3,582,957.

An example of an image processing method for reducing noise in the image is disclosed in U.S. Pat. No. 4,442,454, Image Processing Method Using a Block Overlap Transformation Procedure, which issued Apr. 10, 1984 to P. G. Powell. In the method disclosed, the image is divided into blocks of image elements which are transformed according to the linear transform procedure. Other patents disclosing subject matter related thereto are U.S. Pat. Nos. 3,715,477, 3,996,421, 4,055,756, 4,057,828, 4,134,134, 4,205,341, 4,242,705 and 4,245,248.

An example of a method and apparatus for transforming numerical signal data of a video signal is disclosed in U.S. Pat. No. 4,447,886, Triangle and Pyramid Signal Transforms and Apparatus, which issued May 8, 1984 to G. W. Meeker. As disclosed in this patent, the numerical signal data of the video signal is subjected to a transform domain where the signal is processed and reconstructed into the original domain to provide a replica of the original data. Other patents disclosing subject matter related thereto are U.S. Pat. Nos. 2,921,124, 3,051,778, 3,742,201, 4,222,076, 4,261,018, 4,261,043 and 4,286,330.

An example of an image-processing system employing coring techniques to reduce a noise component of an image signal is disclosed in U.S. Pat. No. 4,523,230, System for Coring an Image-Representing Signal, which issued Jun. 11, 1985 to C. R. Carlson, et al. The Burt Pyramid spectrum analyzer and synthesizer (U.S. Pat. No. 4,674,125) may be employed with the system disclosed in the '230 patent, so that the system can operate in real time on a video signal of a scanned television image. Other patents disclosing subject matter related thereto are U.S. Pat. Nos. 4,163,258 and 4,463,381.

An example of a method and an apparatus for reducing image data while retaining the ability to observe objects with high spatial resolution is disclosed in U.S. Pat. No. 4,692,806, Image-Data Reduction Technique, which issued Sep. 8, 1987 to C. R. Carlson, et al. Other patents disclosing subject matter related thereto are U.S. Pat. Nos. 3,016,518, 3,983,328, 4,405,943 and 4,513,317.

An example of an image processing method for filling in one or more void defects in an image to provide a natural looking processed image is disclosed in U.S. Pat. No. 4,698,843, Method for Compensating for Void-Defects in Images, which issued Oct. 6, 1987 to P. J. Burt, et al. This invention discloses employing The Burt Pyramid as disclosed in U.S. Pat. No. 4,674,125. Other patents disclosing subject matter related thereto are U.S. Pat. Nos. 3,737,855, 3,887,762, 3,973,239, 4,000,399, 4,010,446 and 4,661,986.

Thus as one will ascertain the advertising method and apparatus of this invention requires very precise positioning of a new image into an existing image. The techniques to be described employ pattern recognition apparatus which recognizes pre-selected features or portions of a typical television scene. These features can then be used to locate the position, size and perspective of an artificial electronic advertising message which is added in the exact congruency with the replaced recognized image and appears to the end user as if it were part of the original scene. The added material is inserted into the pre-selected scene independent of size of the selected feature as varying on a frame to frame basis.

DISCLOSURE OF THE INVENTION

Apparatus for altering a video image display to provide a substituted display of desired indicia within a preselected portion of said video image display and independent of the size of said selected portion which size is strictly a function of the TV camera, said TV camera operable at various different perspectives employed to create said display, comprising means for selecting said portion of said display to be substituted, means responsive to said video signal display for recognizing said selected portion of said display, means for generating video signals indicative of said desired indicia to be substituted, means responsive to said desired indicia signals and said video signal for inserting said indicia into said video image display at said preselected portion.

BEST MODE FOR CARRYING OUT THE INVENTION

Figure 1:
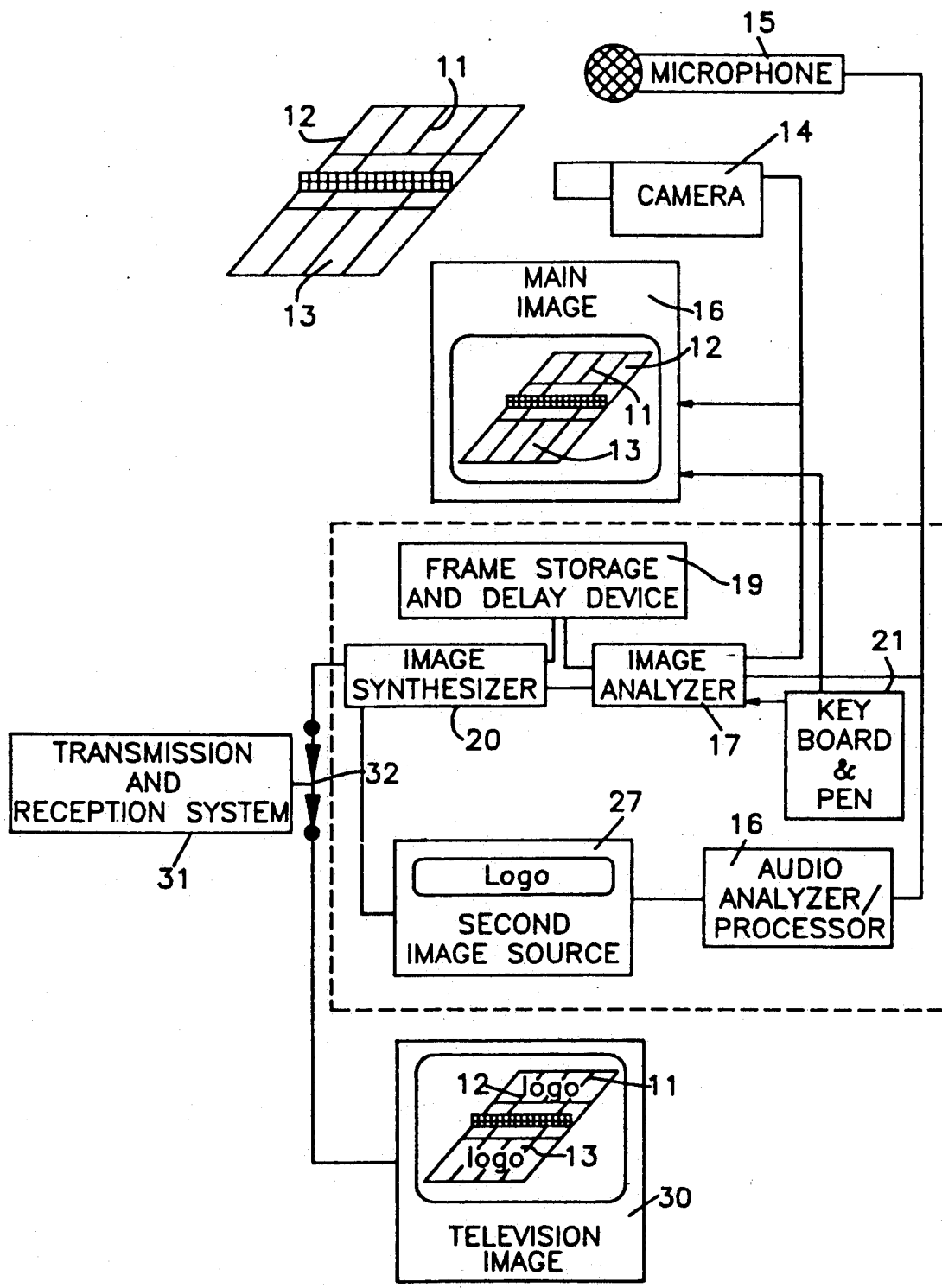
FIG. 1 is a detailed blocked diagram showing an apparatus for recognizing video image formats and inserting desired indicia therefore according to this invention.

Referring to FIG. 1, there is shown a block diagram of a general format of a system employing the apparatus to be described. Before proceeding with a description of the apparatus depicted in FIG. 1, the following comments are pertinent.

The uses of the apparatus and method relate to advertising and include but are not limited to advertising which occurs during sporting events where a field or other scene is normally depicted such as a tennis court, a baseball field, a football field and so on. In such arenas or stadiums there is normally advertising present on the fences or elsewhere. This advertising can continuously be recognized by the techniques to be described, and the advertising which is permanently painted on a fence or displayed on a fence can be replaced. In a similar manner certain areas of the playing field which do not have advertising can now include advertising such as advertising appearing on a tennis court or playing fields. By making the advertising a discrete part of the game itself, the action the game does not have to be interrupted. Even in sports where there are breaks for advertising the method and apparatus to be described is of benefit to advertisers because the message can be displayed while the audience's attention is focused on the action. Apart from this particular application, which relates to advertising, one can also recognize by means of the pattern recognition schemes the boundary lines which are associated with a typical sports court such as the serve line in tennis, the foul line in basketball, the various field lines in baseball, football and so on. These lines can be further recognized and enhanced by artificially including markings for the various field or other lines or boundaries. Apart from such other items, advertising messages can be displayed and then changed and so on during a single televised event.

Figure 2:
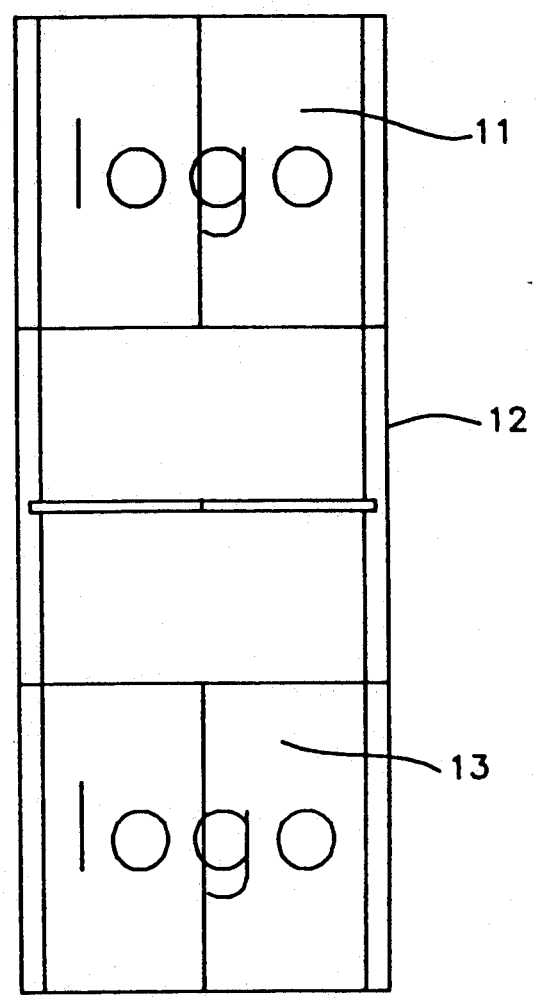
FIGS. 2, 3 and 4 are different perspective plan views of a television image of a tennis court showing how the logo is positioned by the system of FIG. 1 on the tennis court as a function of different perspective views of the court as taken by a typical television camera.

Referring to FIG. 1 there is shown a replica of a typical tennis court 12. The tennis court is separated by a net and has a back court designated 11 with a fore court 13. The tennis court 12 is shown in a perspective view. Shown is a television camera 14 which is in the process of recording the sporting event or tennis match. The opponents are not shown but would be included in a typical tennis match. As will be explained in one embodiment of the invention, the fore court 11 as well as the back court 13 or the entire tennis court 12 is subjected to a pattern recognition algorithm whereby an advertisement is actually inserted directly on the portions of the court as shown in FIG. 2.

Figure 3:
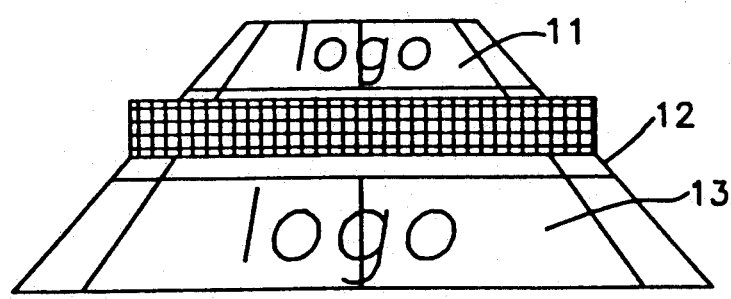

As shown in FIG. 3, the same advertisement or logo is depicted independent of the perspective view of the court and independent of whether the television camera 14 is employing a zoom lens or the scene is televised by an additional camera coupled to suitable equipment. The cameras provide a view of the tennis match through different perspectives or different visual planes. Thus as one can ascertain from FIGS. 2, 3 and 4, the logo will appear in exact conformity with the perspective view of the court so that it will appear as if the logo were permanently imprinted on the actual court being televised. Thus, the television camera 14 is shown televising the tennis match. As will be explained, the output of the camera 14 is coupled directly to a main image television receiver 16 which receives the video signal from the camera and which provides a display of the television signal as shown on the display screen. The camera 14 is also coupled to one input of an image analyzer 17.

Figure 4:
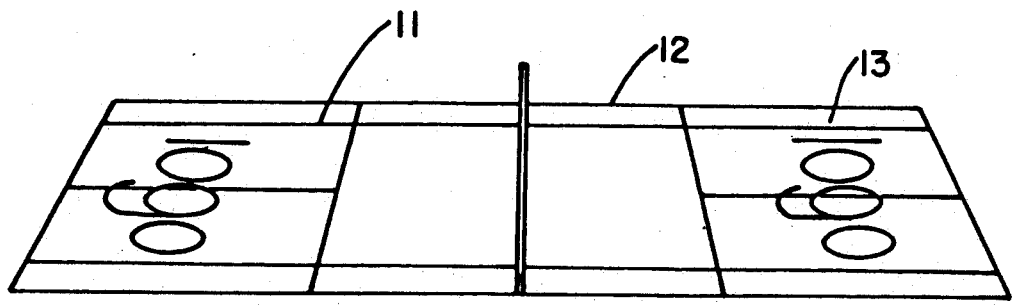

The equipment also includes a microphone 15 utilized to pick up sound from the area being televised with the output of the microphone coupled to an input of the image analyzer 17 and also coupled to the input of an audio analyzer processor module 26. The output from the audio analyzer processing module 26 is directed to an input of a second image source 27. The second image source, as will be explained, operates to provide the advertising message or indicia which may be a slogan, an image, a logo and which advertising message will be displayed on the selected portions 11 & 13 of the tennis court as shown in FIGS. 2, 3 and 4 and designated as logo. The second image source 27 has an output coupled to an image synthesizer 20. The image synthesizer has an output coupled to the image analyzer 17. Both the image synthesizer and the image analyzer have inputs and outputs directed to a frame storage and delay device 19 which will be subsequently explained. Also seen is that the image synthesizer has one output coupled to one terminal of a switch 32 which interfaces with a transmission/reception system 31.

The other terminal of the switch 32 is coupled to a television receiver 30 which as seen in FIG. 1 has the inserted logo positioned on the selected portions of the tennis court. The television receiver 30 is indicative of a user's television as for example used by a consumer viewing the sports event. The operation of the system is basically as follows. Before proceeding further it is understood that the camera 14 and microphone 15 in conjunction with the above noted equipment can directly operate to provide a normal television signal to be transmitted by the transmission and reception system 31 to remote television receivers as 30 as is conventional. Hence, it is indicated that the television camera 14 as well as the microphone 15 and associated equipment are conventional components and therefore capable of providing a typical, normal, unaltered television signal and display. The distribution of the television signal is accomplished via the transmission/reception system 31 which as indicated may be a wireless broadcast or a cable network. Such systems for distributing television signals are extremely well known. If the sender desires to insert a given advertising message or a logo in a selected area of the television display, the following operation occurs.

The image of the event as present on the screen of the television receiver 16 will eventually be altered to incorporate the advertising message which as indicated may be a slogan or image. The alteration may take place at the originating site of the event, at a network broadcast center, a local broadcast center, at a local broadcasting station, at a cable headend or any other site where video signals are disseminated. As one will ascertain, the equipment shown in FIG. 1 is universally adaptable to be utilized at any particular location and is relatively small and transportable. The added message which is provided by the separate video source 27 may be prerecorded on a tape or stored by other means and eventually will be merged into the video stream by the image synthesizer 20. The image synthesizer 20 uses data from the image analyzer 17 and from the frame storage and delay device 19. The essence of this method of advertising is to incorporate the added message from the secondary source 27 into the main image recorded by camera 14 so that the end viewer who is watching the television screen associated with receiver 30 believes that the image is actually imprinted or otherwise permanently located on the tennis court at the actual site of the match.

Also, as shown in FIGS. 2, 3 and 4 the logo is actually added to the television court display even when the television camera is turned, panned and or zoomed to follow the action of the match progressing on the tennis court 12. This merging is seamless and incorporates the logo or advertising message into the video image from the camera 10. The hardware employed incorporates software programs which are all known in the prior art and examples of which have been given above. Essentially, the merging of the advertising message or image into the video images is accomplished in the image analyzer 17. The image analyzer 17 operates in conjunction with the image storage and delay module 19 as well as the image synthesizer 20 to provide the composite picture as shown on the screen of television receiver 30. The image analyzer 17, the image synthesizer 20, the delay module 19 and the video source 27 as well as the audio analyzer and processor 26 constitute the modules which operate to provide the merging of the advertising message with the video signal as will be further described.

The image analyzer 17 includes a conventional computer such as a PC or mini-computer including a suitable memory such as a hard drive and so on. The image analyzer computer 17 is programmed to take the television signal emanating from camera 14 to store the signal and to process the stored signal according to a selected pattern recognition technique so that the incoming video image is processed in real time. The image analyzer 17 may be associated with suitable operating interface equipment such as a keyboard, a light pen or a mouse to allow the operator to originally select the landmarks desired in the original scene. In this manner the operator will for example outline the tennis court 12 as present on the screen of the monitor receiver 16X. The monitor receiver 16 is associated with a computer interface and provides the television image on the screen which image can be interfaced by the system operator. This outline will be stored in memory in regard to digital bits or pixels in the image analyzer. As one can ascertain, the entire video signal as displayed on the screen is broken up into pixels where each television line and each position along a line is represented by a suitable digital number corresponding to the color intensity or content at the line position or to the monochrome content of the line position.

Techniques for converting television signals into digital signals including pixels are extremely well known. Hence one can store the entire representation of a complete television frame or image within a conventional memory by conventional techniques. The light pen or other marking device which is associated with the image analyzer provides an outline of the image which is to be recognized by pattern recognition program such as described in U. S. Pat. No. 4,674,125 wherein the Burt Pyramid Algorithm is employed as one well known technique. While the Burt algorithm as indicated above is extremely useful in implementing pattern recognition to therefore enable the system to recognize the tennis court, many other techniques for pattern recognition including other algorithms may be used. There have been entire books and volumes written on pattern recognition and image processing. See for example "The Proceedings of the IEE", May, 1979 issue entitled "Pattern Recognition and Image Processing", Volume 67, Num. 5, Pgs. 705-880. Many of the above noted patents describe various other techniques for performing pattern recognition. The image analyzer 14 as well as the image synthesizer 22 are electronic or optical processors and include software capable of implementing the Burt pyramid or other pattern recognition techniques and for processing the incoming video images in real time. Algorithms such as the Burt pyramid algorithm enploy a particular sampling technique analyzing a relatively high resolution video signal into a hierarchy of N (where N is a plural integer), separate component images in which each component image is a Laplacian image comprised of a different octave of the spatial frequencies of the original image, plus a remnant Gaussian image.

The term "pyramid" relates to the successive reduction in spatial frequency and sample density of each of the hierarchy of the component images in going from the highest octave component to the lowest octave component image. This algorithm is computationally effective and can deal with visual images that are intended for viewing by human beings within the typical television frame rates. There are other techniques which can also be employed to process the image, and, as indicated, the frame and storage device 19 can for example delay many frames and hence the processing can be slowed down a great deal depending on whether or not one wishes a simultaneous transmission of the actual event or a delayed version thereof. Operation of the system as indicated is basically as follows. The operator views the image as presented on the monitor television receiver 16 and marks selective portions of the outlines of the court or the net area to choose or to direct that portion of the displayed image to be recognized and where the advertising indicia will be inserted. In this particular example the operator will mark the upper court 11 and the lower court 13 by means of a light pen or other suitable device and therefore instruct or command the image analyzer 17 to recognize these markings in subsequent video images of the court 12 as televised by the camera. The image synthesizer is now employed to locate, position and orient, including the correct magnification, the indicia or logo, which is taken from the second image source 27 so that it appears as part of the original scene. The logo which is generated by the second image source 27 is made to appear as part of the background and does not interfere with objects or people in the foreground. This may be accomplished by allowing the logo to key over specific colors or ranges of colors such as the color of a court in the tennis match.

As one will understand, a tennis court for example is a certain shade of green. Thus the areas 11 and 13 are green or some other color which completely differentiates from the colors of the uniforms as well as the skin of the players or participants. By means of conventional RGB color processing the image analyzer can therefore store information relating to:

1) the outline of the court as selected by the operator and 2) the color of the court as further evidenced by the detail in the video image. In this manner the image analyzer 17 transfers information to the image synthesizer 20. The image synthesizer receives information relating to the position and location of the court portions 11 and 13. The image synthesizer 20 then takes the video information from the second image source 27 and inserts this information in the images of the court section 11 and 13. This insert appears as the logo which is depicted in FIGS. 2, 3 and 4. This insertion is done by means of the frame storage and delay device 19 wherein the video images are stored. The information from the image synthesizer is now inserted in absolute proper location, position and orientation including the correct magnification into a stored picture which picture is now re-routed through the image synthesizer to the transmission and reception system 31. This causes the display on television receiver 30 to be shown, as indicated. The distinction between the foreground and background may also be identified by other techniques apart from color detection. It is, of course, clear that by not keying over specific colors such as clothing and flesh colors one will only provide the logo in the areas 11 and 13 and the logo will be obscured by the players as to only the portion of the player that overlies the logo. Hence it appears as if the logo is actually painted directly on the tennis court.

Apart from color recognition, one can distinguish between the tennis court and the background of the court by other techniques such as optical image analysis and so on. For example, motion regarding the video content can be easily detected by responding to frequencies present at the scanning rate (horizontal). Thus, the prior art was capable of detecting motion by responding to such frequencies. Hence this system can be used to insert the logo only in the selected area and only when motion is not detected. Motion can also be detected on a frame-to-frame comparison of video content. The resultant effect is to allow a viewer to watch the televised match completely as it is occurring with advertising conspicuously added directly on the court. The advertising or logo could be of any particular format such as numbers, objects and so on. It is, of course, understood that the pattern recognition technique can discriminate and select almost any object present in a television picture. For example, the operator may select the back portion of a player's uniform and the pattern recognition algorithm will recognize that back portion of the player and the logo is inserted by means of the second image source 27 on the player's back. Thus, apart from a tennis court, one can insert advertisements on the back wall of a baseball field or on the pitcher's mound or any other selected place. It is actually up to the advertiser and the user to determine where the logo is to be inserted, and the system assures that the logo inserted will always be in proper perspective no matter how the particular sport event being televised is viewed.

The frame storage and delay device 19 operates to allow the analyzer 17 as well as the image synthesizer 20 to process the signal in real time. Thus, the time delay module receives the signal and, basically, is a frame store or a multi-frame store device. The frame and storage delay module 19 can utilize CCD devices or MOS technology or other frame storage devices and technologies. There are virtually many devices in the prior art which can store single frames or multiple frames of video. The frame storage device, again as indicated, can be any memory medium that has relatively fast read-/write times so that it can compatibly operate with the video signal. The amount of delay and storage depends on the speed of the analyzer 17 as well as the quality of the image from the video camera 14. For larger and high definition video formats one would require more memory. The memory can be on an optical disc or can be implemented by other well known memory techniques.

The present system utilizes the microphone 15 which as indicated is coupled to an audio analyzer processor 26 for accommodating special effects. The audio analyzer processor 26 again can be a minicomputer or a high speed PC together with a hard disc or other type memory. The audio processor 26 as well as the microphone 28 are included, and basically the microphone is a conventional component for providing sound to enable the transmission of normal television signals. The audio processor 26 monitors the audio stream emanating from the microphone 28 and the sound as processed by the processor is used to control aspects of the image as inserted by the second image video source 27. Thus, the audio processor can respond to the magnitude of the signal from the microphone 15 and alter the logo which is displayed on the court accordingly.

For example, let us assume that a point is made by one player after a rather spectacular rally. In these instances the crowd usually responds by loud clapping and cheering. In this way in order to fully emphasize the reaction of the crowd one can utilize the increased sound level to modulate the logo. For example, to turn the logo on and off, or to change the color and hence add dimensions to the overall televised presentation to further enable the advertiser to obtain maximum benefit from the advertisement. Such techniques are relatively simple to implement and are well within the ordinary ken of one skilled in the art. The audio processor can also include a voice recognition system which systems are commercially available. Thus, particular words or statements can be recognized by the audio processor as those words or statements spoken by a commentator. In this manner the inserted video can be made to respond accordingly.

For example, certain baseball commentators are famous for their particular expressions such as the expression "holy cow"; when the commentator uses this expression one knows that either a home run or some other spectacular event has occurred. In this way the indicia or logo is inserted by means of the pattern recognition processing technique described above and can be modulated or suitably altered in regard to such recognized words or phrases. The applications which are available by utilizing the above described technology are too numerous to mention as is the existing technology which can accomplish these techniques. Thus, the extensive prior art listed in the beginning of this application is indicative of the various different techniques which can be employed to implement the above described operation. As one can immediately ascertain, the potential uses of the methods and apparatus described involve advertising, but as indicated, they can be utilized in directing the viewer's attention to particular places on the sports court such as highlighting the outlines of the court.

Another technique which can easily be employed by using the techniques is the marking or modulation of the progress of a ball being utilized in for example a tennis match or during a baseball game. As one can ascertain in many scenes which are displayed on television, it is extremely difficult to follow the flight of a pitched or struck ball. Based on the real time operation of the algorithms described for pattern recognition, it would be relatively easy to recognize the ball as thrown for example between a pitcher and catcher. In this manner the pattern recognition apparatus would recognize the ball and one can modulate the path of the ball on a frame-to-frame basis thus enabling the viewer to clearly distinguish the ball and to visualize the ball during the course of the baseball game. The ball can also be recognized in regard to that employed in a tennis match. As one can understand, in certain tennis matches such as those played on clay, it is often difficult to see the ball and hence the above techniques can be utilized in enhancing the game by recognition of the ball on a frame-to-frame basis, thereafter marking or inserting indicia indicative of the trajectory of the ball.

The applications of the above technology in regard to advertisements are many and include placing advertising in and around the court of play, placing advertising on a bowling ball or a basketball (either of which are easy to recognize) placing advertisement on the bowling alley lane or parts of a basketball or tennis court including the backboard of a basketball court or the net of a tennis court. These techniques will enable one to provide inserted patches on individual players such as on the arm or the back of the player which then can be replaced with advertisements which can be varied during the course of a match or can be different in different parts of the country or different parts of the world. One can utilize the inserted video display to provide advertising effects such as modulating the display when a particular event is achieved. One can also utilize the above described techniques to actually insert score boards in regard to certain games. For example, a score board could be superimposed on the fence in a baseball game or elsewhere where such facilities do not exist.

While it is understood that the block diagram and specification herein depicted in FIG. 1 are devoid of any specific examples of algorithms or of the programs utilized to implement the technology, it is again indicated that the pattern recognition and algorithms and techniques are all well known in the art, and any one of such algorithms can be successfully employed and incorporated in this system with a minimum of effort. Those listed in the many patents and articles and other presentations cited in this application are applicable. It is, of course, understood that each and every module depicted in FIG. 1 is available and can be programmed to render the accomplished task with a minimum of effort.

Thus, the above described techniques are well within the ken of one skilled in the art, and the aspect of providing a desired video image within a recognizable pattern associated with a video display is readily achieved by these techniques. It is, of course, understood that the pattern recognition algorithm has been basically described as related to sporting events or events where the field or other particular object is displayed fairly often during the televised presentation.

It is, of course, understood that the techniques described herein will have applicability to other televised events such as contests, game shows and so on and is not limited in any manner to sporting events.

Each and every module as indicated above has been further referenced in greater detail in the disclosed prior art.

It is, therefore, indicated that the invention as described herein has great utility, and it is understood that alternate embodiments can be employed but the general content and scope of the invention is embodied in the enclosed claims.

We claim:

1. Apparatus for altering a video image display to provide a substituted display of desired indicia within a preselected portion of said video image display and independent of the size or perspective of said selected portion, said size and perspective of said selected portion varying in accordance with the perspective and range of a video camera means operable to generate signals corresponding to an image viewed by said camera means, said signal causing said image to be displayed by said video image display, comprising:

means for selecting said portion of said display to be substituted, said selected portion being indicative of an identifiable segment of said televised image and said identifiable segment being subject to changes in size and perspective, means responsive to said video image display signals for recognizing said selected portion of said display, means for generating video signals indicative of said desired indicia to be substituted, means responsive to said video signals indicative of said desired indicia and said video image display signals for inserting a video representation of said indicia into said video image display at said preselected portion.

2. The apparatus according to claim 1, further including:

audio processing means responsive to audio signals associated with said televised scene to alter said substituted display portion according to said audio signals.

3. The apparatus according to claim 2, wherein said display indicia is modulated according to the intensity of said audio signals, which signals exceed a given threshold.

4. The apparatus according to claim 1, wherein said means for selecting includes a light pen for outlining said portion of said display to be selected and means for storing said selected outline.

5. The apparatus according to claim 1, wherein said desired indicia includes an advertising message.

6. The apparatus according to claim 1, further including:

delay means responsive to said recognized video signal and said video signals representative of said desired indicia for showing the same on a frame-to-frame basis to enable the insertion of said indicia on a real time basis.

7. The apparatus according to claim 1, wherein said means responsive to said video signal display includes pattern recognition means responsive to said selected portion of said display to provide signals indicative of said selected portion independent of the size of said portion with respect to said display.

8. The apparatus according to claim 7, wherein said pattern recognition means includes means for performing a pyramid algorithm.

9. The apparatus according to claim 1, further including means responsive to colors present in said video display to inhibit display substitution during the presence of selected colors, whereby replaceable pixels can be substituted for non-replaceable pixels.

10. A method for altering a video image display to provide a substituted display of desired indicia within a preselected portion of said video image display and independent of the size or perspective of said selected portion, said size and perspective of said selected portion varying in accordance with the perspective and range of a video camera means operable to generate signals corresponding to an image viewed by said camera means, said signal causing said image to be displayed by said video image display, comprising the steps of:
- selecting said portion of said display to be substituted, said selected portion being indicative of an identifiable segment of said televised image and said identifiable segment being subject to changes in size and perspective,
- recognizing said selected portion of said display and independent of the size or perspective of said portion with respect to said display,
- generating a video image of said desired indicia, and
- inserting said image of said desired indicia within said recognized portion of said display on a.

11. The method according to claim 10, wherein the step of generating a video image of desired indicia includes generating a video image of an advertising format such as a manufacturer's trademark or logo.

12. The method according to claim 11, wherein said selected portion of said display to be substituted comprises the boundaries of a sports court, with said desired indicia including enhanced replicas of said boundaries.

13. The method according to claim 10, further including the step of:
- detecting the intensity of audio signals emanating from said televised scene and altering the inserted image according to said detected audio.

14. The method according to claim 10, further indicates the step of:
- selectively responding to a color present in said display for inhibiting the insertion of said desired indicia within said selected portion according to the presence of said color.

15. The method according to claim 10, further including the step of:
- storing said selected portion of said display in a memory prior to inserting the same into said stored selected portion.

16. The method according to claim 10, wherein the step of recognizing includes,
- applying a pattern recognition algorithm to said video display after selecting said portion, wherein said algorithm is a pyramid algorithm capable of processing said displayed image enabling recognition of said selected portion independent of the size, location or orientation of the same with respect to said display on a frame-to-frame basis.

17. The method according to claim 16, wherein said algorithm is the Burt Pyramid Algorithm.

18. The method according to claim 10, wherein the step of selecting includes outlining said selected portion of said display with a light pen and
- storing the outline of said light pen indicative of said selected portion.

19. The method according to claim 10, further including the step of:
- modulating said inserted video image according to the sound intensity emanating from said televised scene.

20. The method according to claim 10, further including the step of:
- detecting motion in said display during a frame and inhibiting said video image of said desired indicia into said display according to said detected motion.

21. Apparatus for altering a video image display to provide a substituted display of desired indicia within a preselected portion of said video image display and independent of the size of said selected portion which size is strictly a function of the TV camera, said TV camera operable at various different perspectives employed to create said display, comprising:
- means for selecting said portion of said display to be substituted,
- means responsive to said video signal display for recognizing said selected portion of said display,
- means for generating video signals indicative of said desired indicia to be substituted,
- means responsive to said desired indicia signals and said video signal for inserting said indicia into said video image display at said preselected portion, and
- audio processing means responsive to audio signals associated with the televised scene comprising said video image display to alter said substituted display portion according to said audio signals.

22. The apparatus according to claim 21 wherein said display indicia is modulated according to the intensity of said audio signals, which signals exceed a given threshold.

23. Apparatus for altering a video image display to provide a substituted display of desired indicia within a preselected portion of said video image display and independent of the size of said selected portion which size is strictly a function of the TV camera, said TV camera operable at various different perspectives employed to create said display, comprising:
- means for selecting said portion of said display to be substituted,
- means responsive to said video signal display for recognizing said selected portion of said display, including pattern recognition means responsive to said selected portion of said display to provide signals indicative of said selected portion independent of the size of said portion with respect to said display, and wherein said pattern recognition means includes means for performing a pyramid algorithm,
- means for generating video signals indicative of said desired indicia to be substituted,
- means responsive to said desired indicia signals and said video signal for inserting said indicia into said video image display at said preselected portion.

24. A method for altering a video image display to provide a substituted display of desired indicia within a preselected portion of said video image display on a frame-to-frame basis and independent of the size of said selected portion on a frame-to-frame basis which size is a function of the TV camera perspective employed to create said display, comprising the steps of:
- selecting said portion of said display to be substituted,
- recognizing said selected portion of said display on a frame-to-frame basis and independent of the size of said portion with respect to said display,
- generating a video image of said desired indicia,
- inserting said image of said desired indicia within said recognized portion of said display on a frame-to-frame basis, and
- detecting the intensity of audio signals emanating from the televised scene comprising said video image display and altering the inserted image according to said detected audio.

25. A method for altering a video image display to provide a substituted display of desired indicia within a preselected portion of said video image display on a frame-to-frame basis and independent of the size of said selected portion on a frame-to-frame basis, which size is a function of the TV camera perspective employed to create said display, comprising the steps of:
  selecting said portion of said display to be substituted,
  recognizing said selected portion of said display on a frame-to-frame basis and independent of the size of said portion with respect to said display, whereby a pattern recognition algorithm is applied to said selected portion and wherein said algorithm is a pyramid algorithm capable of processing said displayed image enabling recognition of said selected portion independent of the size, location or orientation of the same with respect to said display on a frame-to-frame basis,
  generating a video image of said desired indicia, and
  inserting said image of said desired indicia within said recognized portion of said display on a frame-to-frame basis.

26. The method according to claim 25 where said algorithm is the Burt Pyramid Algorithm.

27. A method for altering a video image display to provide a substituted display of desired indicia within a preselected portion of said video image display on a frame-to-frame basis and independent of the size of said selected portion on a frame-to-frame basis which size is a function of the TV camera perspective employed to create said display, comprising the steps of:
  selecting said portion of said display to be substituted,
  recognizing said selected portion of said display on a frame-to-frame basis and independent of the size of said portion with respect to said display,
  generating a video image of said desired indicia,
  inserting said image of said desired indicia within said recognized portion of said display on a frame-to-frame basis, and
  modulating said inserted video image according to the sound intensity emanating from the televised scene comprising said video image display.

28. A method for altering a video image display to provide a substituted display of desired indicia with a preselected portion of said video image display on a frame-to-frame basis and independent of the size of said selected portion on a frame-to-frame basis which size is a function of the TV camera perspective employed to create said display, comprising the steps of:
  selecting said portion of said display to be substituted,
  recognizing said selected portion of said display on a frame-to-frame basis and independent of the size of said portion with respect to said display,
  generating a video image of said desired indicia,
  inserting said image of said desired indicia within said recognized portion of said display on a frame-to-frame basis, and
  detecting motion in said display during a frame and inhibiting said video image of said desired indicia into said display according to said detected motion.

29. Apparatus for altering a video image display to provide a substituted display of desired indicia within a preselected portion of said video image display and independent of the size of said selected portion which size is strictly a function of the TV camera, said TV camera operable at various different perspectives employed to create said display, comprising:
  means for selecting said portion of said display to be substituted,
  means responsive to said video signal display for recognizing said selected portion of said display, including pattern recognition means responsive to said selected portion of said display to provide signals indicative of said selected portion independent of the size of said portion with respect to said display,
  means for generating video signals indicative of said desired indicia to be substituted,
  means responsive to said desired indicia signals and said video signal for inserting said indicia into said video image display at said preselected portion.

30. Apparatus for altering a video image display to provide a substituted display of desired indicia within a preselected portion of said video image display and independent of the size or perspective of said selected portion, said size and perspective of said selected portion varying in accordance with the perspective and range of a video camera means operable to generate video signals corresponding to an image viewed by said camera means, said video signal causing said image to be displayed by said video image display, comprising:
  means for selecting said portion of said display to be substituted, said selected portion being indicative of an identifiable segment of said televised image and said identifiable segment being subject to changes in size and perspective at the frame rate of said video signal,
  means responsive to video attributes outside the perimeter of said selected portion of said display for recognizing said selected portion of said display,
  means for generating video signals indicative of said desired indicia to be substituted,
  means responsive to said video signals indicative of said desired indicia and said video image display signals for inserting a video representation of said indicia into said video image display.

31. A method for altering a video image display to provide a substituted display of desired indicia within a preselected portion of said video image display and independent of the size or perspective of said selected portion, said size and perspective of said selected portion varying in accordance with the perspective and range of a video camera means operable to generate video signals corresponding to an image viewed by said camera means, said video signal causing said image to be displayed by said video image display, comprising the steps of:
  selecting said portion of said display to be substituted, said selected portion being indicative of an identifiable segment of said televised image and said identifiable segment being subject to changes in size and perspective at the frame rate of said video signal,
  recognizing said selected portion of said display at said frame rate and independent of the size or perspective of said portion with respect to said display,
  generating a video image of said desired indicia, and
  inserting said image of said desired indicia into an area of said display determined with respect to said recognized portion at the frame rate of said video signal.

32. Apparatus for altering a video image display to provide a substituted display of desired indicia within a preselected portion of said video image display and independent of the size or perspective of said selected portion, said size and perspective of said selected portion varying in accordance with the perspective and range of a video camera means operable to generate video signals corresponding to an image viewed by said camera means, said video signal causing said image to be displayed by said video image display, comprising:

means for selecting said portion of said display to be substituted, said selected portion being indicative of an identifiable segment of said televised image and said identifiable segment being subject to random variation in size and perspective from image to image, means responsive to video attributes outside the perimeter of said selected portion of said display for recognizing said selected portion of said display, means for generating video signals indicative of said desired indicia to be substituted, means responsive to said video signals indicative of said desired indicia and said video image display signals for inserting a video representation of said indicia into said video image display.

33. A method for altering a video image display to provide a substituted display of desired indicia within a preselected portion of said video image display and independent of the size or perspective of said selected portion, said size and perspective of said selected portion varying in accordance with the perspective and range of a video camera means operable to generate video signals corresponding to an image viewed by said camera means, said video signal causing said image to be displayed by said video image display, comprising the steps of:

selecting said portion of said display to be substituted, said selected portion being indicative of an identifiable segment of said televised image and said identifiable segment being subject to random variation in size and perspective from image to image, recognizing said selected portion of said display, said recognition being independent of the size or perspective of said portion with respect to said display, generating a video image of said desired indicia, and inserting said image of said desired indicia into an area of said display determined with respect to said recognized portion.

34. The apparatus according to claim 1 wherein said means responsive to said video image display signals for recognizing said selected portion of said display operates in response to video attributes outside the perimeter of said selected portion of said display.

35. The method according to claim 10 wherein the step of recognizing said selected portion of said display is responsive to video attributes outside the perimeter of said selected portion of said display.

36. The apparatus according to claim 21 wherein said means responsive to said video image display signals for recognizing said selected portion of said display operates in response to video attributes outside the perimeter of said selected portion of said display.

37. The method according to claim 24 wherein the step of recognizing said selected portion of said display is responsive to video attributes outside the perimeter of said selected portion of said display.

38. The apparatus according to claim 1 wherein said selected portion comprises an object within said video image display and whereby a path traversed by said object from image to image is highlighted, including use of an enhanced image of said object as said inserted indicia.

39. The apparatus according to claim 1 wherein said selected portion comprises an object within said video image display and whereby the path traversed by said object from image to image is highlighted, including use of a modulated image of said object as said inserted indicia.

40. The apparatus according to claim 23 wherein said selected portion comprises an object within said video image display and whereby the path traversed by said object from image to image is highlighted, including use of an enhanced image of said object as said inserted indicia.

41. The apparatus according to claim 23 wherein said selected portion comprises an object within said video image display and whereby the path traversed by said object from image to image is highlighted, including use of a modulated image of said object as said inserted indicia.

42. The method according to claim 10 wherein said selected portion comprises an object within said video image display and whereby the path traversed by said object, from image to image, is highlighted, including use of a modulated image of said object as said inserted indicia.

43. The method according to claim 10 wherein said selected portion comprises an object within said video image display and whereby the path traversed by said object, from image to image, is highlighted, including use of an enhanced image of said object as said inserted indicia.

44. The method according to claim 25 wherein said selected portion comprises an object within said video image display and whereby the path traversed by said object, from image to image, is highlighted, including use of a modulated image of said object as said inserted indicia.

45. The method according to claim 25 wherein said selected portion comprise an object within said video image display and whereby the path traversed by said object, from image to image, is highlighted, including use of an enhanced image of said object as said inserted indicia.

* * * * *

UNITED STATES PATENT AND TRADEMARK OFFICE
CERTIFICATE OF CORRECTION

PATENT NO. : 5,264,933

DATED : November 23, 1993

INVENTOR(S) : Rosser, et al.

It is certified that error appears in the above-identified patent and that said Letters Patent is hereby corrected as shown below:

In claim 10, line 21 (corresponding to Column 13, line 18), after "display" delete "on a".

Signed and Sealed this

Twenty-fourth Day of May, 1994

*Attest:*

BRUCE LEHMAN

*Attesting Officer*      *Commissioner of Patents and Trademarks*

(12) EX PARTE REEXAMINATION CERTIFICATE (6042nd)
United States Patent
Rosser et al.

(10) Number: US 5,264,933 C1
(45) Certificate Issued: Dec. 11, 2007

(54) TELEVISION DISPLAYS HAVING SELECTED INSERTED INDICIA

(75) Inventors: Roy J. Rosser, Princeton, NJ (US); Martin Leach, London (GB)

(73) Assignee: PVI Virtual Media Services, LLC, New York, NY (US)

Reexamination Request:
No. 90/007,881, Jan. 18, 2006

Reexamination Certificate for:
Patent No.: 5,264,933
Issued: Nov. 23, 1993
Appl. No.: 07/826,754
Filed: Jan. 28, 1992

Certificate of Correction issued May 24, 1994.

(51) Int. Cl.
*H04N 5/272* (2006.01)

(52) U.S. Cl. .................. 348/578; 348/61; 348/722; 348/E5.058; 345/419

(58) Field of Classification Search .............. 348/578, 348/61, 722, E5.058; 345/419
See application file for complete search history.

(56) References Cited

U.S. PATENT DOCUMENTS

| | | | |
|---|---|---|---|
| 2,611,819 A | 9/1952 | Serrell | 178/71 |
| 2,784,246 A | 3/1957 | Hurford | 178/5.8 |
| 2,921,124 A | 1/1960 | Graham | 178/6 |
| 3,016,518 A | 1/1962 | Taylor | 340/149 |
| 3,051,778 A | 8/1962 | Graham | 178/6.8 |
| 3,140,710 A | 7/1964 | Glassner et al. | 128/2.05 |
| 3,315,222 A | 4/1967 | Bogs | 340/15.5 |
| 3,470,468 A | 9/1969 | Halpern | 324/77 |
| 3,473,121 A | 10/1969 | Hurtig et al. | 324/77 |
| 3,580,993 A | 5/1971 | Sandorf et al. | 178/6 |

(Continued)

FOREIGN PATENT DOCUMENTS

| | | |
|---|---|---|
| EP | 0 360 576 | 3/1990 |
| GB | 9102995.9 | 2/1990 |

(Continued)

OTHER PUBLICATIONS

"Visual Tracking with Deformation Models" by James Rehg et al, Carnegie Mellon University, Aug. 1990.*

"Applications of Dynamic Monocular Machine Vision", from "Machine Vision & Applications: An International Journal", Jain et al (editors), 1998.*

(Continued)

*Primary Examiner*—Charles R. Craver

(57) ABSTRACT

An apparatus and method of altering video images to enable the addition of images, message, slogans or indicia in such a manner that they appear to be part of the original image as displayed. The application of the apparatus and method is particularly adapted to be used as advertising during sporting events or other events whereby an operator selects a portion of the video image display (16) such as a portion of a tennis court (12), recognizes the selected portion (17) and inserts a logo or advertising message (27) into that selected portion. The message is inserted into the selected portion of the court independent of how the scene is being panned or viewed by the television camera. The apparatus employs a pattern recognition algorithm such as the Burt Pyramid Algorithm to recognize the specific selected image portion and by means of the image processor (17, 20, 27) substitute the logo into the first image (16) to provide a display which appears as if the inserted image was actually painted on or otherwise permanently positioned on the court. Thus the inserted images are seamlessly and realistically incorporated into the original even as the original scene is moved, panned, magnified, zoomed or otherwise altered in size or perspective. The resulting composite image appears to the television viewer to be absolutely real and present at the scene.

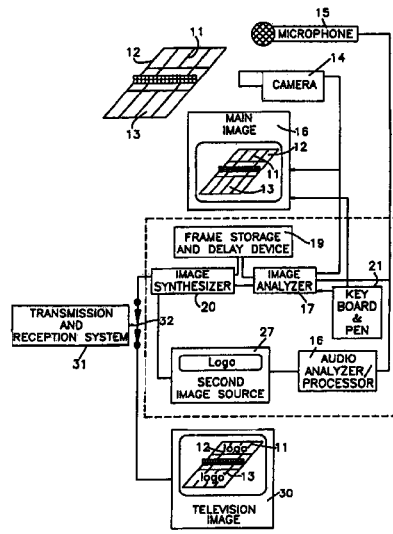

U.S. PATENT DOCUMENTS

| | | | |
|---|---|---|---|
| 3,582,957 A | 6/1971 | Herleikson | 346/33 |
| 3,617,630 A | 11/1971 | Reiffel | 178/6.8 |
| 3,715,477 A | 2/1973 | Langdon et al. | 178/5.4 |
| 3,731,188 A | 5/1973 | Smith | 324/77 |
| 3,737,855 A | 6/1973 | Cutaia | 340/146.3 |
| 3,742,201 A | 6/1973 | Groginsky | 235/156 |
| 3,833,760 A | 9/1974 | Tickle | 178/6.8 |
| 3,872,460 A | 3/1975 | Fredrickson et al. | 340/324 |
| 3,887,762 A | 6/1975 | Uno | 178/6 |
| 3,973,239 A | 8/1976 | Kakumoto et al. | 340/146.3 |
| 3,983,328 A | 9/1976 | Newell | 178/6.8 |
| 3,996,421 A | 12/1976 | Pruznick et al. | 178/7.3 |
| 4,000,399 A | 12/1976 | Kawahara | 235/92 |
| 4,010,446 A | 3/1977 | Kawa | 340/146.3 |
| 4,045,815 A | 8/1977 | Griffith et al. | 358/163 |
| 4,055,756 A | 10/1977 | Jolivet et al. | 364/725 |
| 4,057,828 A | 11/1977 | Monahan | 358/32 |
| 4,084,184 A | 4/1978 | Crain | 358/93 |
| 4,092,673 A | 5/1978 | Adams | 358/183 |
| 4,134,134 A | 1/1979 | Lux | 358/280 |
| 4,163,258 A | 7/1979 | Ebihara et al. | 357/167 |
| 4,205,341 A | 5/1980 | Mitsuya et al. | 358/135 |
| 4,222,076 A | 9/1980 | Knowlton | 358/263 |
| 4,242,705 A | 12/1980 | Ebihara | 358/167 |
| 4,245,248 A | 1/1981 | Netravali et al. | 358/136 |
| 4,261,018 A | 4/1981 | Knowlton | 358/263 |
| 4,261,043 A | 4/1981 | Robinson et al. | 364/725 |
| 4,286,330 A | 8/1981 | Isaacson | 364/900 |
| 4,385,322 A | 5/1983 | Hubach et al. | 358/221 |
| 4,393,394 A | 7/1983 | McCoy | 358/22 |
| 4,405,943 A | 9/1983 | Kanaly | 358/133 |
| 4,425,581 A | 1/1984 | Schweppe et al. | 358/148 |
| 4,442,454 A | 4/1984 | Powell | 358/167 |
| 4,447,886 A | 5/1984 | Meeker | 364/725 |
| 4,463,381 A | 7/1984 | Powell et al. | 358/166 |
| 4,477,830 A | 10/1984 | Lindman et al. | 358/1 |
| 4,486,774 A | 12/1984 | Maloomain | 358/93 |
| 4,498,098 A | 2/1985 | Stell | 358/22 |
| 4,513,317 A | 4/1985 | Ruoff, Jr. | 358/133 |
| 4,523,230 A | 6/1985 | Carlson et al. | 358/167 |
| 4,528,589 A | 7/1985 | Block et al. | 358/122 |
| 4,533,952 A | 8/1985 | Norman, III | 358/160 |
| 4,539,585 A | 9/1985 | Spackova et al. | 358/93 |
| 4,566,126 A | 1/1986 | Miyagawa et al. | 382/48 |
| 4,580,165 A | 4/1986 | Patton et al. | 358/148 |
| 4,591,897 A | 5/1986 | Edelson | 358/22 |
| 4,602,286 A | 7/1986 | Kellar et al. | 358/183 |
| 4,631,588 A | 12/1986 | Barnes et al. | 358/149 |
| 4,639,768 A | 1/1987 | Ueno et al. | 358/22 |
| 4,644,401 A | 2/1987 | Gaskins | 358/183 |
| 4,661,986 A | 4/1987 | Adelson | 382/41 |
| 4,667,221 A | 5/1987 | Cawley et al. | 358/22 |
| 4,667,236 A | 5/1987 | Dresdner | 358/160 |
| 4,674,125 A | 6/1987 | Carlson et al. | 382/49 |
| 4,675,725 A | 6/1987 | Parkyn | 358/22 |
| 4,680,622 A | 7/1987 | Barnes et al. | 358/22 |
| 4,692,806 A | 9/1987 | Anderson et al. | 358/22 |
| 4,698,843 A | 10/1987 | Burt et al. | 382/54 |
| 4,700,232 A | 10/1987 | Abt et al. | 358/183 |
| 4,703,514 A | 10/1987 | van der Wal | 382/41 |
| 4,713,695 A | 12/1987 | Macheboeuf | 358/262 |
| 4,724,543 A | 2/1988 | Klevecz et al. | 382/6 |
| 4,750,050 A | 6/1988 | Belmares-Sarabia et al. | 358/311 |
| 4,750,211 A | 6/1988 | Wray | 382/41 |
| 4,792,972 A | 12/1988 | Cook, Jr. | 380/20 |
| 4,806,924 A | 2/1989 | Giraud et al. | 340/792 |
| 4,817,175 A | 3/1989 | Tenenbaum et al. | 382/41 |
| 4,855,832 A | 8/1989 | Carmean | 358/183 |
| 4,907,086 A | 3/1990 | Truong | 358/183 |
| 4,908,700 A | 3/1990 | Ishii et al. | 358/22 |
| 4,947,256 A | 8/1990 | Wood et al. | 358/183 |
| 4,949,165 A | 8/1990 | Riemann et al. | 358/10 |
| 4,949,279 A | 8/1990 | Takakura et al. | 364/518 |
| 4,954,883 A | 9/1990 | Belmares-Sarabia et al. | 358/22 |
| 4,979,021 A | 12/1990 | Thomas | 358/22 |
| 4,980,766 A | 12/1990 | Vladkov | 358/183 |
| 4,992,781 A | 2/1991 | Iwasaki et al. | 340/747 |
| 4,994,914 A | 2/1991 | Wiesman et al. | 358/160 |
| 5,023,720 A | 6/1991 | Jardins | 358/183 |
| 5,045,937 A | 9/1991 | Myrick | 358/109 |
| 5,046,165 A | 9/1991 | Pearman et al. | 358/183 |
| 5,058,189 A | 10/1991 | Kanno | 382/61 |
| 5,060,068 A | 10/1991 | Lindstrom | 358/185 |
| 5,060,171 A | 10/1991 | Steir et al. | 364/521 |
| 5,063,603 A | 11/1991 | Burt | 382/37 |
| 5,099,319 A | 3/1992 | Esch et al. | 358/86 |
| 5,099,331 A | 3/1992 | Truong | 358/183 |
| 5,107,252 A | 4/1992 | Traynar et al. | 340/712 |
| 5,142,576 A | 8/1992 | Nadan | 380/20 |
| 5,175,622 A | 12/1992 | Inoue et al. | 358/183 |
| 5,175,806 A | 12/1992 | Muskovitz et al. | 395/125 |
| 5,185,665 A | 2/1993 | Okura et al. | 358/183 |
| 5,214,615 A | 5/1993 | Bayyer | 367/128 |
| 5,227,985 A | 7/1993 | DeMenthon | 364/559 |
| 5,233,423 A | 8/1993 | Jernigan et al. | 358/181 |
| 5,274,453 A | 12/1993 | Maeda | 358/183 |
| 5,293,540 A | 3/1994 | Trani et al. | 348/584 |
| 5,305,107 A | 4/1994 | Gale et al. | 348/590 |
| 5,305,108 A | 4/1994 | Trytko | 348/594 |
| 5,309,174 A | 5/1994 | Minkus | 345/204 |
| 5,345,313 A | 9/1994 | Blank | 348/598 |
| 5,353,392 A | 10/1994 | Luquet et al. | 395/135 |
| 5,432,900 A | 7/1995 | Rhodes et al. | 395/154 |
| 5,436,672 A | 7/1995 | Medioni et al. | 348/591 |
| 5,469,536 A | 11/1995 | Blank | 395/131 |
| 5,488,675 A | 1/1996 | Hanna | 382/284 |
| 5,491,517 A | 2/1996 | Kreitman et al. | 348/581 |
| 5,543,856 A | 8/1996 | Rosser et al. | 348/578 |
| 5,566,251 A | 10/1996 | Hanna et al. | 382/284 |
| 5,627,915 A | 5/1997 | Rosser et al. | 382/219 |
| 5,731,846 A | 3/1998 | Kreitman et al. | 348/581 |
| 5,903,317 A | 5/1999 | Sharir et al. | 348/589 |
| 5,913,727 A | 6/1999 | Ahdoot | 463/39 |

FOREIGN PATENT DOCUMENTS

| | | |
|---|---|---|
| GB | 9019770.8 | 9/1990 |
| JP | 61-150589 | 7/1986 |
| JP | 63-187177 | 8/1988 |
| JP | 2-306782 | 2/1990 |
| JP | 02-306782 | 12/1990 |
| JP | 7-212653 | 8/1995 |
| WO | WO90/16131 | 12/1990 |
| WO | WO 93-06691 | 4/1993 |
| WO | WO 95/10915 | 4/1995 |

OTHER PUBLICATIONS

"Rubtique Des Coups," *Extrait de l'emission Culture Pub*, Dec. 16, 1990 (Bates S004074–S004087).

"Epsis: Watch this Space" (Bates No. S004075).

Avril Connard, "Now You See It, Now You Don't" (Bates No. S004076).

Jerome Bonaldi, Canal Plus (Jan. 28, 1991) (Bates No. S004077–8).

"Au Doigt et a L'oeil," *Canal Imagina 91*, p. 63 (Feb. 6, 1991) (Bate No. S004079).

Television, "Le Temps Des Vraies Fausses Images" (Feb. 23, 1991) (Bate No. S004080–4).

"Le Marche' De L'imaginaire Est Bien Reel," *Decisions Image De Synthese* (Feb. 25, 1991) (Bate No. S004085).

Chapter 4.3.2: *Graphics*, pp. 152–157 (Bates Nos. S002704–S002709).

"Digital Image Fundamentals," pp. 56–68 (Bates Nos. S002710–S002722).

Chapter 10: *Segmentation* (pp. 120–131) (Bates No. 5003070–S003075).

P. Sorensen, "Algorithm Advancements," (Bates 5004053–004058).

D. Davis, "Big–Time, Massively Parallel processing systems alter the face and the pace of supercomputing," (Bates S004059–5004065).

Israel Notice Under §16 of Israeli Patent Law IL 108957A0: *A System For Implanting An Image Into A Video Screen*, Published Jun. 24, 1994.

A. Rosenfeld, "Multiresolution Image Processing and Analysis," *Springer Series Information Science*, pp. 2–37; 38–101, 148–211 (1988).

M.J. Hannah, "SRI's Baseline Stereo System" Proc. DARPA Image Understanding workshop, pp. 149–155 (1985).

K. Fan, et al., "Parallel Mechanism for Detecting Contours in Binary Images," *Journal of Electronic Imaging 3(1)*, pp. 30–36 (Jan. 1994).

T. Uchiyama, et al., "Color Image Segmention Using Competitive Learning," *IEEE Transactions on Pattern Analysis and Machine Intelligence*, vol. 16, No. 12, pp. 1197–1206 (Dec. 1994).

G. Khan, et al., "Extracting Contours by Perceptual Grouping," (Bates No. S003250–S003263).

A. Faruque, et al., "Parallel Processing Architecture for the Efficient Use of Memory in Image Processing Applications," *Optical Engineering*, vol. 30, No. 7, pp. 994–1004 (Jul. 1991).

D. Sheu, "A Generalized Method for 3D Object Location From Single 2D Images," *Pattern Recognition*, vol. 25, No. 8, pp. 771–786 (1992).

W. Long, et al., "Stationary Background Generation: An Alternative to the Difference of Two Images," *Pattern Recognition*, vol. 23, No. 12, pp. 1351–1359 (1990).

A. Cumani, et al., "Image Description of Dynamic Scenes," *Pattern Recognition*, vol. 24, No. 7, pp. 661–673 (1991).

P. Suetens, et al., "Computational Strategies for Object Recognition," *ACM Computing Surveys*, vol. 24, No. 1, pp. 5–61 (Mar. 1992).

Z. Hong, "Algebraic Feature Extraction of Image for Recognition," *Pattern Recognition*, vol. 24, No. 3, pp. 211–219 (1991).

J. Ullmann, "Edge Replacement in the Recognition of Occluded Objects," *Pattern Recognition*, vol. 26, No. 12, pp. 1771–1784 (1993).

J. Wu, et al., "Color Image Segmentation Using Fuzzy Clustering and Supervised Learning," *Journal of Electronic Imaging 3(4)*, pp. 397–403 (Oct. 1994).

S. Yacoub, et al., "Characterizing the Hierarchical Hough Transform Through a Polygonal Approximation Algorithm," *Pattern Recognition Letters 16*, pp. 389–397 (1995).

D. Dori, et al., "A Pattern Recognition Approach to the Detection of Complex Edges," *Pattern Recognition Letters 16*, pp. 517–529 (1995).

A. Pikaz, et al., "An Algorithm for Polygonal Approximation Based on Iterative Point Elimination," *Pattern Recognition Letters 16*, pp. 557–563 (1995).

C.L. Tan, et al., "Efficient Edge Detection Using Hierarchical Structures," *Pattern Recognition*, vol. 26, No. 1, pp. 127–135 (1993).

L. Boxer, "Computer Deviations From Convexity in Polygons", *Pattern Recognition Letters 14*, pp. 163–167 (1993).

D. Phillips, "Image Processing Part 5: Writing Images To Files And Basic Edge Detection," *The C Users Journal*, pp. 75–101 (1991).

D. Phillips, "Image Processing Part 6: Advanced Edge Detection," *The C Users Journal*, pp. 47–63 (1992).

Pineda's "Rasterization Algorithm," *IEEE Computer Graphics and Applications*, pp. 51–52 (Nov. 1992).

M. Irani, et al., "Improving Resolution By Image Registration," *CVGIP: Graphical Models And Image Processing*, vol. 53, No. 3, pp. 231–239 (1991).

S. Geman et al., "A Nonlinear Filter For Film Restoration And Other Problems In Image Processing," *CVGIP: Graphical Models And Image Processing*, vol. 54, No. 4, pp. 281–289 (1992).

D. Metaxas et al., "Reconstruction Of A Color Image From Nonuniformly Distributed Sparse And Noisy Data," *CVGIP: Graphical Models And Image Processing*, vol. 54, No. 2, pp. 103–111 (1992).

H. Radha, "Binary Space Partitioning Tree Representation Of Images," *Journal Of Visual Communication And Image Representation*, vol. 2, No. 3 pp. 201–221 (1991).

L. Berger et al., "A New Formulation For Fast Image Coding Using Quadtree Representation," *Pattern Recognition Letters*, vol. 13, pp. 425–432 (1992).

S. Liou et al., "An Approach To Three–Dimensional Image Segmentation," *CVGIP: Image Understanding*, vol. 53, No. 3, pp. 237–252 (1991).

A. Emmett, "Something for Everybody," *Computer Graphics World*, pp. 29–39 (Jul. 1982).

J. Arvo, "Computer Gems" Academic Press, Inc., pp. 181–191(1991).

James M. Rehg and Andrew P. Witkin, "Visual Tracking with Deformation Models", Aug. 1990, School of Computer Science, Carnegie Mellon University, Pittsburgh, PA 15213, pp. 1–12.

E. Dickmanns and Volker Graefe, "Applications of Dynamic Monocular Machine Vision", *Machine Vision and Applications* (1988), vol. 1, No. 4, pp. 241–261.

P.J. Burt, "Pyramid–Based Extraction Of Local Image Features with Applications to Motion and Texture Analysis"; *SPIE* vol. 360, pp. 114–124.

P.J. Burt, "Fast Algorithms For Estimating Local Image Properties," *IEEE*, pp. 669–671(1982).

V. Cantoni, et al., "Pyramidal Systems For Computer Vision," *NATO ASI Series*, pp. 115–24 (1986).

P.J. Burt, et al "Object Tracking With A Moving Camera: An Applications of Dynamic Motion Analysis," *Proceedings of the Workshop on Visual Motion*, Irvine, GA, pp. 1–12 (Mar. 20–22, 1989).

Q. Tian, et al. "Algorithms for Subpixel Registration," *Computer Vision Graphics and Image Processing*, vol. 35, Aug. 2, 1986, pp. 220–233.

M.J. Hannah, "A System for Digital Stereo Image Matching," *Photogrammetric Engineering and Remote Sensing*, pp. 1765–1770, (1989).

G. Sandini, (Ed) "Computer Vision Eccv '92—Lecture Notes in Computer Science" *Second European Conference on Computer Vision Santa Margherita Ligure*, Italy, May 1992 Proceedings.

H. Nagel, "Analysis Techniques for Image Sequences" *Proceeding of the Fourth International Joint Conference on Pattern Recognition,* Nov. 7–10, 1978, Kyoto, Japan.

B. K. P. Horn, et al., "Determining Optical Flow," *Artificial Intelligence (An International Journal, Special. Volume on Computer Vision,* vol. 1, Nos. 1–3, (Aug. 1981).

M. Hannah, "Bootstrap Stereo" *Image Understanding—Proceedings of a Workshop Held at College Park, Maryland,* (Apr. 30, 1980).

E. Grimson, "Object Recognition by Computer".

Bob Swain, "Computer: Frame and Fortune for Poster Ads—New Image Proceeding Systems Will Revolutionise Advertising at Sports Events" *Guardian,* (Mar. 7, 1991).

Mason, J.; "For Hockey Fans the Puck Stops Here" *Sports Illustrated,* vol. 73, No. 13 (Oct. 8, 1990).

M. Berthod, et al., "Reconstruction of High Resolution 3D Visual Information," *Proc. CVPR,* Seattle (Jun. 94).

G. Wei, "Implicit and Explicit Camera Calibration: Theory and Experiments," *IEEE Transactions on Pattern Analysis and Machine Intelligence,* vol. 16, No. 5, pp. 469–480 (May 1994).

T. Matsuyama, et al, "A Structural Analyzer for Regularly Arranged Textures," *Computer Graphics and Imagte Processing 18,* pp. 259–278 (1982).

K. Qian, et al., "Determining Holes and Connectivity in Binary Images," *Comput. & Graphics,* vol. 16, No. 3, pp. 283–288 (1992).

W.E. Snyder, et al., "Closing Gaps In Edges and Surfaces," *Image & Vision Computing,* vol. 10, No. 8 (Oct. 1992).

N. Ansari et al., "Non–Parametric Dominant Point Detection," *Pattern Recognition,* vol. 24, No. 9, pp. 849–862 (1991).

B. Brillault–O'Mahony, "New Method for Vanishing Point Detection," *CVGIP: Image Understanding,* vol. 54, No. 2, pp. 289–300 (Sep. 1991).

A. Cumani, et al., "An Edge–Based Description of Color Images," *CVGIP: Graphical Models and Image Processing,* vol. 53, No. 4, pp. 313–323 (Jul. 1991).

Y. Xiaqhan, "A New Algorithm for Texture Segmentation Based on Edge Detection," *Pattern Recognition,* vol. 24, No. 11, pp. 1105–1112 (1991).

H. Tan, "A Cost Minimization Approach to Edge Detection Using Simulated Annealing," *IEEE Transactions on Pattern Analysis and Machine Intelligence,* vol. 14, No. 1 (Jan. 1991).

J. Shen, et al., "An Optimal Linear Operator for Step Edge Detection," *CVGIP: Graphical. Models and Image Processing,* vol. 54, No. 2, pp. 112–133 (Mar. 1992).

R. Wilson, et al., "Kernal Designs for Efficient Multiresolution Edge Detection and Orientation Estimation," *IEEE Transactions on Pattern Analysis and Machine Intelligence,* Correspondence, vol. 14, No. 3 (Mar. 1992).

G.P. He, et al., "A Method to Design Filters for Image Smoothing," *Pattern Recognition Letter 13,* pp. 509–515 (Jul. 1992).

A. Toet, "Multiscale Color Image Enhancement," *Pattern Recognition Letter 13,* pp. 167–174 (Mar. 1992).

P. Saint–Marc, et al., "Adaptive Smoothing: A General Tool For Early Vision," *IEEE Transactions on Pattern Analysis and Machine Intelligence,* vol. 13, No. 6, pp. 514–529 (Jun. 1991).

J. Bigün, et al., "Multidimensional Orientation Estimation With Applications to Texture Analysis and Optical Flow," *IEEE Transactions on Pattern Analysis and Machine Intelligence,* vol. 13, No. 8, pp. 775–790 (Aug. 1991).

D. He, et al., "Texture Features Based on Texture Spectrum," *Pattern Recognition,* vol. 24, No. 5, pp. 391–399 (1991).

S. Arya, et al., "Textural Analysis of Range Images," *Pattern Recognition Letter 12,* pp. 619–626 (Oct. 1991).

P. Trahanias, "Binary Shape Recognition Using the Morphological Skeleton Transform," *Pattern Recognition,* vol. 25, No. 11, pp. 1277–1288 (Nov. 1992).

W. E. Grimson, "On the Verification of Hypothesized Matches in Model–Based Recognition," *IEEE Transactions on Pattern Analysis and Machine Intelligence,* vol. 13, No. 12, pp. 1201–1213 (Dec. 1991).

T. M. Strat, et al., "Context–Based Vision: Recognizing Objects Using Information from Both 2–D and 3–D Imagery," *IEEE Transactions on Pattern Analysis and Machine Intelligence,* vol. 13, No. 10, pp. 1050–1065 (Oct. 1991).

A. A. Rodriguez, et al., "Image Segmentation by Successive Background Extraction," *Pattern Recognition,* vol. 24, No. 5, pp. 409–420 (1991).

D. Nichols, et al., "Image Segmentation and Matching Using the Binary Object Forest," *Butterworth–Heinemann Ltd* (1991) (Bates No. 5002972–S002981).

D. Bhandari, et al., "Fuzzy Divergence, Probability Measure of Fuzzy Events and Image Thresholding," *Pattern Recognition Letters 13,* pp. 857–867 (Dec. 1992).

J. Leu, "Image Contrast Enhancement Based on the Intensities of Edge Pixels," *CVGIP: Graphical Models and Image Processing,* vol. 54, No. 6, pp. 497–506 (Nov. 1992).

S. Negahdaripour, "Multiple Interpretations of the Shape and Motion of Objects from Two Perspective Images," *IEEE Transactions on Pattern Analysis and Machine Intelligence,* vol. 12, No. 11, pp. 1025–1039 (Nov. 1990).

J. H. Duncan, et al., "On the Detection of Motion and the Computation of Optical Flow," *IEEE Transactions on Pattern Analysis and Machine Intelligence,* vol. 14, No. 3, pp. 346–352 (Mar. 1992).

S. W. Lee, et al., "Detection of Specularity Using Colour and Multiple Views," *Image & Vision Computing,* vol. 10, No. 10, pp. 643–653 (Dec. 1992).

Y. F. Wang, et al., "A Study on Using Structure Lighting to Analyze Time Varying Image Sequences," *Pattern Recognition,* vol. 24, No. 8, pp. 723–738 (1991).

M. Gökmen, et al., "Edge Detection and Surface Reconstruction Using Refined Regularization," *IEEE Transactions on Pattern Analysis and Machine Intelligence,* vol. 15, No. 5, pp. 492–499 (May 1993).

G. F. McLean, "Codebook Edge Detection," *CVGIP: Graphical Models and Image Processing,* vol. 55, No. 1, pp. 48–57 (Jan. 1993).

W. E. L. Grimson, et al., "On the Sensitivity of the Hought Transform for Object Recognition," *IEEE Transactions on Pattern Analysis and Machine Intelligence,* vol. 12, No. 3, pp. 225–274 (Mar. 1990).

M. Jacob, "Transformation of Digital Images by Discrete Affine Applications," *Comput. & Graphics,* vol. 19, No. 3, pp. 373–389 (1995).

S. Lejun, et al., "A New Contour Fill Algorithm For Outlined Character Image Generation," *Comput. & Graphics,* vol. 19, No. 4, pp. 551–556 (1995).

J. Illingworth, et al., "A Survey of the Hough Transform," *Computer Vision, Graphics, and Image Processing 44*, pp. 87–116 (1988).

Illingworth, et al., "Survey of the Hough Transform," pp. 95–116 (Bates No. S003228–S003249).

D.C. W. Pao, et al., "Shapes Recognition Using the Straight Line Hough Transform: Theory and Generalization," *IEEE Transactions on Pattern Analysis and Machine Intelligence*, vol. 14, No. 11, pp. 1076–1089 (Nov. 1992).

J. A. Webb, "Steps Toward Architecture–Independent Image Processing," pp. 21–31 (Feb. 1992).

C. C. Weems, "Image Understanding Architecture: Exploiting Potential Parallelism in Machine Vision,," *Project Overviews*, pp. 65–68 (Feb. 1992).

N. Ansari, et al., "Partial Shape Recognition: A Landmark–Based Approach," *IEEE Transactions on Pattern Analysis and Machine Intelligence*, vol. 12, No. 5 pp. 470–483 (May 1990).

Z. Pizlo, et al., "Recognition of Planar Shapes from Perspective Images Using Contour–Based Invariants," *CVGIP: Image Understanding*, vol. 56, No. 3, pp. 30–350 (Nov. 1992).

M. Spetsakis, "Models of Statistical Visual Motion Estimation," *CVGIP: Image Understanding*, vol. 60, No. 3, pp. 300–312 (Nov. 1994).

G. Hofmann, "The Modeling of Images for Communication in Multimedia Environments and the Evolution from the Image Signal to the Image Document," *The Visual Computer*, vol. 9, No. 6, pp. 303–317 (1993).

R. Alter–Gartenberg, et al., "Compact Image Representation by Edge Primitives," *CVGIP: Graphical Models and Image Processing*, vol. 56, No. 1, pp. 1–7 (Jan. 1994).

S. Hwang, et al., "Parallel Coordination of Image Operators: Model, Algorithm and Performance," *Image & Vision Computing* (Bates No. S003526–S003535).

L. Breene, et al., "Image Warping by Scanline Operations," *Comput & Graphics*, vol. 17, No. 2, pp. 127–130 (1993).

B. Vatti, "A Generic Solution to Polygon Clipping," *Communications of the ACM*, vol. 35, No. 7, pp. 56–63 (Jul. 1992).

R. Brinkmann, "3–D Graphics, From Alpha to Z–Buffer," *BYTE*, pp. 271–278 (Jul. 1990).

M. Hagen, How to Make a Visually Realistic 3D Display, *Computer Graphics*, vol. 25, No. 2, (Apr. 1991).

D. Phillips, "Image Processing, Part 8," *The C Users Journal*, vol. 10, No. 11, pp. 89–116 (Nov. 1992).

M. Slater, et al., "A Statistical Comparison of Two Hidden Surface Techniques: the Scan–line and Z–buffer Algorithms", *Computer Graphics forum*, vol. 11, No. 2, pp. 131–138 (1992).

E. Angel, et al., "Short Note: Speeding Up Bresenham's Algorithm," *IEEE Computer Graphics & Applications*, p. 16 (Bates No. S003609).

S. Wells, et al., "Dithering for 12–Bit True–Color Graphics," *IEEE Computer Graphics & Applications*, pp. 18–29 (Sep. 1991).

D. van Dam, "1991 Steven A. Coons Award Lecture," *Computer Graphics*, vol. 26, No. 3, pp. 205–208 (Aug. 1992).

D. Duce, et al., "Formal Specification in the Revision of GKS: An Illustrative Example," *Computer Graphics Forum*, vol. 11, No. 1, pp. 17–30 (1962).

B. Kirsch, et al., "Conformance Testing for Computer Graphics Standards," *Computer Standards & Interfaces 12*, pp. 35–42 (1991).

S. Abi–Ezzi, et al., "Factoring A Homogeneous Transformation for A More Efficient Graphics Pipeline," *Comput. & Graphics*, vol. 15, No. 2, pp. 249–258 (1991).

D. Phillips, "Image Processing, Part 9: Histogram–Based Image Segmentation," *The C Users Journal*, pp. 63–88 (1993).

C. Blum et al., "Requirements for the First International Imaging Standard," *IEEE*, pp. 61–70 (1991).

I. C. Carlsen, et al., "IKS$^{PFH}$—Concept And Implementation Of An Object–Oriented Framework For Image Processing," *Comput. & Graphics*, vol. 15, No. 4, pp. 473–481 (1991).

P. Gemmar et al., "Design Of An Iconic Kernel System," *Comput. & Graphics*, vol. 15, No. 4, pp. 483–493 (1991).

T. Butler et al., "An Overview Of The Programmer's Imaging Kernel (PIK) Proposed Standard," *Comput. & Graphics*, vol. 15, No. 4, pp. 465–472 (1991).

P.J. Narayanan, "Replicated Data Algorithms In Image Processing," *CVGIP: Image Understanding*, vol. 56, No. 3, pp. 351–365.

N. T. Allen, "A Pixel Ordering Algorithm—A Shortcut For Interactive Development," *Dr. Dobb's Journal*, pp. 56, 58, 60–61, 116–117, (1990).

S. Janke, "Recursive Images—Using Simple Recursion And Iterated Function Systems To Draw Natural Objects," *Dr. Dobb's Journal*, pp. 16–78 (1991).

J. P. Oakley et al., "Efficient Method For Finding The Position Of Object Boundaries To Sub–Pixel Precision," (Bates Nos. 5003803–5003813).

R. P. Wildes, "Direct Recovery Of Three–Dimensional Scene Geometry From Binocular Stereo Disparity," *IEEE Transactions On Pattern Analysis And Machine Intelligence*, vol. 13, No. 8, pp. 761–774 (1991).

W. Smith, "Ray Tracing For Rendering 2–D Cross–Sections; Of 3–D Objects," *The C Users Journal*, pp. 45–52 (1992).

G. J. Dunnett et al., "The Image Chip For High Performance 3D Rendering," *IEEE Computer Graphics & Applications*, vol. 12, No. 6, pp. 41–50 (1992).

P. G. Anderson, "Fast Rendering," *Computer Language*, vol. 10, pp. 41–45 (Feb. 1993).

J. K. Smith, "Color Rendering Techniques," *AIXpert*, pp. 67–74 (1991).

M. J. DeHaemer, et al., "Simplification Of Objects Rendered By Polygonal Approximations," *Comput. & Graphics*, vol. 15, No. 2, pp. 175–184 (1991).

J. Martens, "Deblurring Digital Images By Means Of Polynomial Transforms," *Computer Vision, Graphics, And Images Processing*, vol. 50, pp. 157–176 (1990).

J. Biemond et al., "Iterative Methods For Imaging Deblurring," *IEEE*, (Bates No. S003892–S003919) (1990).

A. K. Katsaggelos, A Multiple Input Image Restoration Approach, *Journal of Visual Communication and Image Representation*, vol. 1, No. 1, pp. 93–103 (1990).

L. Chang et al., "A Fast Algorithm For The Restoration Of Images Based On Chain Codes Description And Its Applications," *Computer Vision, Graphics, And Image Processing*, vol. 50, pp. 296–307 (1990).

S. Maybank, "Ambiguity In Reconstruction From Image Correspondences," pp. 93–99 (Bates Nos. 5003970–5003976).

W. E. Carlson, "A Survey Of Computer Graphics Image Encoding And Storage Formats," *Computer Graphics,* vol. 25, No. 2, pp. 67–75, (1991).

M. Goldberg et al., "Comparative Performance Of Pyramid Data Structures For Progressive Image Transmission," *IEEE Transactions On Communications,* vol. 39, No. 4, pp. 540–548 (1991).

M. Brown, et al., "Color and Sound in Algorithm Animation," *Computer,* vol. 25, No. 12, pp. 52–63 (Dec. 1992).

R.W. Frischholz, "A Class of Algorithms for Real–Time Subpixel Registration", *Europto Conference,* Munich (Jun. 1993).

T. Darrell, et at, "A Novel Environment for Situated Vision and Behavior," *M.I.T Media Laboratory Perceptual Computing Technical Report No. 261* Presented at IEEE Workshop for Visual Behaviors, CVPR–94 (1994).

M. Yamamoto, "Human Motion Analysis Based on a Robot Arm Model, Computer Vision Section," *Electrotechnical Laboratory* 1–1–4, Umezono, Tsukuba–shi Ibaraki 305, JAPAN (1991).

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–45 is confirmed.

* * * * *